United States Patent Office 2,830,194
Patented Apr. 8, 1958

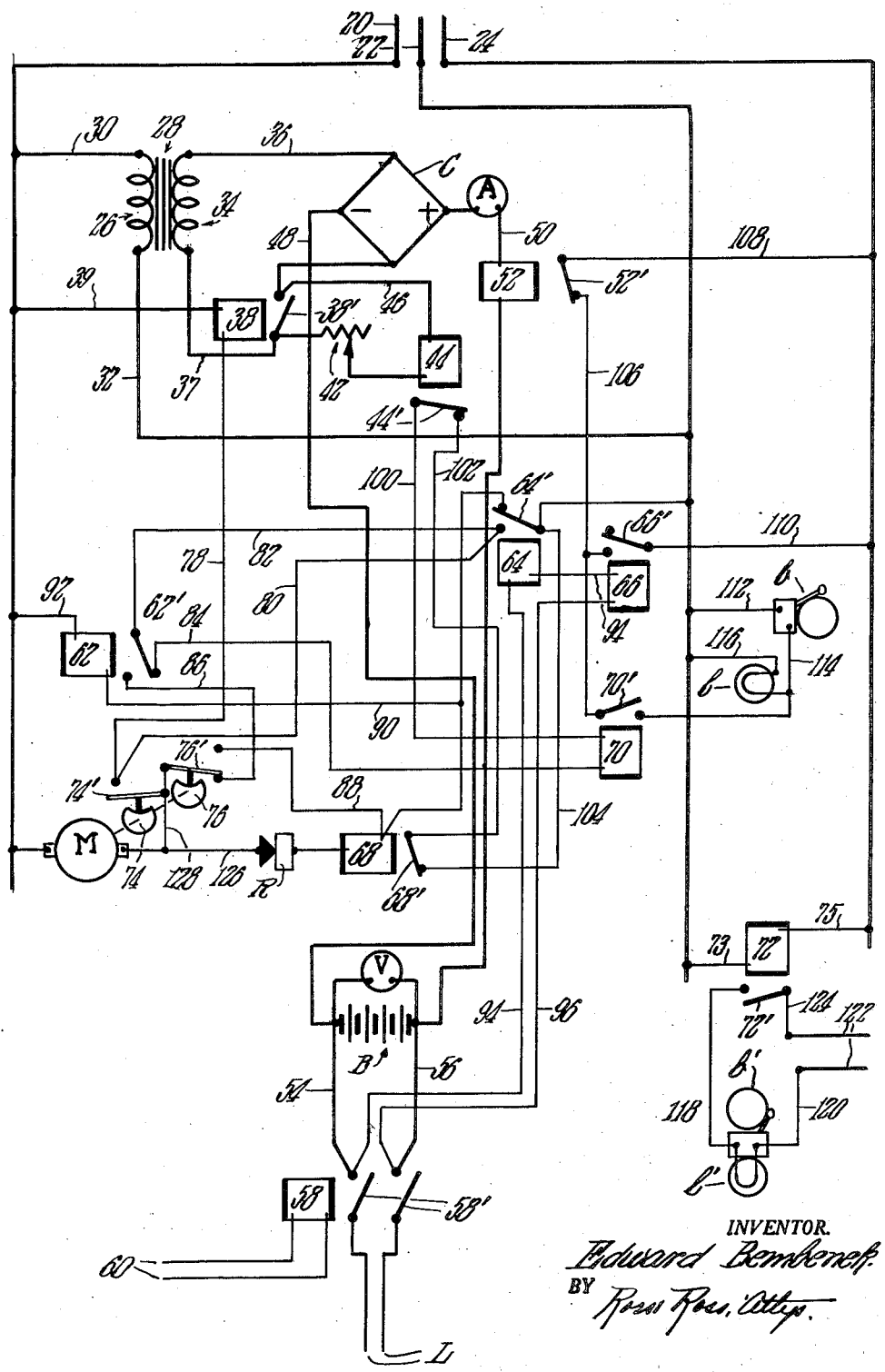

2,830,194

SUPPLEMENTARY, AUXILIARY, OR EMERGENCY LIGHTING AND/OR POWER SYSTEMS

Edward Bembenek, Springfield, Mass., assignor to The Standard Electric Time Company, Springfield, Mass., a corporation of Connecticut Application March 19, 1956, Serial No. 572,395

10 Claims. (Cl. 307—64)

This invention relates to new and useful improvements in an automatic, battery powered supplementary, auxiliary or emergency lighting and/or power system.

The system is designed to supply supplementary, auxiliary or emergency electrical current in the event of a failure of the normal electrical current supply or in the event of an accident to one or more of the elements of a system normally supplying electrical current, all to the end that life and property may be better protected.

The invention is particularly applicable where municipal, state or federal codes require a supplementary, auxiliary or emergency lighting and/or power system.

The invention, broadly speaking, envisions a supplementary, auxiliary or emergency electrical circuit, means to connect said circuit to a battery circuit for supplementary, auxiliary or emergency lighting and/or power when the normal source of electrical supply fails or is otherwise restricted, a general method of battery charging, a method of battery supervision, a method of main electrical current supply supervision, a method of supplementary, auxiliary or emergency electrical current supply supervision and a method of battery charger circuit supervision.

It also contemplates a battery charging system whereby means of maintaining the electrical capacity of a battery is provided, which means is capable of automatically increasing the magnitude of the electrical charging current to the battery when, through use or otherwise, the battery reaches a predetermined condition of discharge.

It contemplates the inclusion hereinto of an automatic battery charging unit as a key component of the assembled system and, by means of which, a battery is charged from the normal source of electrical current at either a high fast or a low trickle rate. A means responsive to the condition of electrical capacity of the battery is provided to control the increase and reduction of the electrical charging rate when the battery condition reaches certain predetermined values.

The invention includes means for maintaining a normal constant electrical charging current to the battery at a low or trickle rate. Additional means is provided for automatically charging the battery at a high or fast rate. Still additionally, means is provided, which is responsive to a predetermined condition of battery capacity, for transferring the battery from one rate of charging to the other.

Whenever a normal electrical current source is disrupted, so as to call the supplementary, auxiliary or emergency system into play by throwing a circuit across the battery and thereby causing an appreciable discharge from the battery, the system provides for the high fast rate of charging to commence immediately or as soon as the voltage of the normal current supply circuit is restored.

In its broadest sense, this invention envisions a means for supplying current to a supplementary, auxiliary or emergency electrical load together with one or more supervisory means for creating derangement signals, audible or visual or both, in the event of the malfunction of any component so as to render the system ineffective or inoperative together with an auxiliary supervising means in the event the main supervisory means is rendered defective or inoperative.

One of the principal features of the invention is the provision of an automatic battery charger, and appropriate electrical loads which are connected together as a system or a closed circuit. Said components are operated under monitoring electrical current supervision so that any interruption of said monitoring current throughout the system causes derangement signals to be actuated until the deficiency is corrected.

Supplementary, auxiliary or emergency electrical systems are generally installed in places of public assemblage where the uninterrupted service of electrical current is required, such as buildings subject to occupancy by large numbers of persons, and which are supplied with electricity derived from public service stations and where it is desirable to have an auxiliary type of electrical system deriving current from an auxiliary source for use in emergency.

An auxiliary, emergency lighting system in a theater or similar place of public assemblage commonly includes exit signs, to indicate the location of the exists, and other lighting equipment, sometimes called "emergency lights," the purpose of which is to provide sufficient illumination in the auditorium, corridors, lobbies, passageways, stairways, and fire escapes to facilitate egress in the event of failure of the normal lighting system.

It will be understood that the supplementary, auxiliary or emergency electrical system described herein may be extended to include a system to provide power for such functions as essential refrigeration, operation of mechanical breathing apparatus, operation of incubators, ventilation when essential to maintain life, illumination and power for hospital operating rooms, fire alarm systems, industrial processes and the like where current interruption would produce obviously serious hazards.

The desideratum is that the system be so designed that the full required voltage and electrical capacity of the supplementary, auxiliary or emergency electrical supply source be available for at least a predetermined minimum time. Adequate electrical capacity is essential as it is obviously desirable that the supplementary, auxiliary or emergency current be available for the necessary supply to the emergency and egress lighting as well as to such other equipment as may be required for continued operation through connection to the supplementary, auxiliary or emergency system.

Electrical current supply, according to most codes, must be such that in the event of failure of the normal electrical current supply to or within the building concerned, supplementary, auxiliary or emergency lighting, or supplementary, auxiliary or emergency power, or both supplementary, auxiliary or emergency lighting and power, will be immediately available.

The invention possesses numerous other objects and features of advantage, some of which, with the foregoing, will be set forth in the following description thereof.

It is to be expressly understood that I do not limit myself to this disclosure of species of the invention as variant embodiments thereof may be adopted, all within the scope of the appended claims.

The drawing is a diagrammatic wiring diagram of a system embodiyng the novel features of the invention.

Referring now to the drawing more in detail, the invention will be fully described.

With reference to the drawing, a normal electrical current source is represented by 20, 22 and 24 for voltages of 120 volts across the wires of a pair.

The embodiment illustrated herein contemplates a source of three phase alternating current although it will be understood that another source of normal electrical current could be employed. For purposes of disclosure however, this description will refer to the three phase source.

The automatic battery charger, about to be described, is normally compartmentized as a unit within an enclosure. However, compartmentation per se does not form a part of the invention and, accordingly, same is not shown or described herein, nor are the various instrument panels which might be especially adapted for the best functioning of the system shown or described herein and for the same, above stated, reason.

A primary winding 26 of a transformer 28 of the high impedance type and characteristics is connected across the normal A.-C. supply circuit between conductors 20 and 22 by means of connections 30 and 32 respectively.

The secondary winding 34 of the transformer is connected by means of a connection 36 to an input terminal of a full-wave rectifier C and by connection 37 to the arm or swinging contact 38' of a relay 38 and to a variable resistance 42 which is connected to a relay 44.

The relay 44 is connected by connection 46 to the input of the rectifier C, along which connection is a contact for the arm 38' of relay 38, as shown.

The relay 38, variable resistance 42, and relay 44 are connected in series.

The relay 38 is connected by connection 39 to the line 20.

The relay 38 is provided with a contact, as shown, and functions to shunt out the resistance 42 and the relay 44, whereby the full value of the transformer's secondary voltage may be brought to an input terminal of the rectifier, when and as desired.

That is to say, by means of the relays 38 and 44 and the resistance 42, the transformer output is controlled.

When the relay 44 and the resistance 42 are not shunted out, the charger is on the low trickle rate of charge. When these members are shunted out, the charger is on the high fast rate of charge. The charge to the battery is at the high fast or slow trickle rate, all according to the condition of the battery and the load demands thereon.

Connections 48 and 50 extend from the output of the rectifier C to opposite sides of a battery B. A voltmeter V thereacross facilitates testing of the voltage of the battery B.

The battery B is the supplementary, auxiliary or emergency source of electrical energy and consists of a plurality of nickel cadmium or other storage battery cells. It functions to furnish D.-C. to the emergency electrical circuit when the normal source of A.-C. fails.

It is adapted, when fully charged, to furnish and maintain the required electrical load for a specified time period (for example thirty minutes) with an end voltage of not less than ninety-one percent of the nominal D. C. voltage of the system in satisfaction of the usual electrical code requirements.

The battery B is charged by means of the rectifier C, as aforesaid, same being placed across the D.-C. output of the rectifier, the output terminals of the rectifier C being connected by means of the connections 48 and 50 to the opposite positive and negative terminals of the battery B.

An ammeter A is located along the connection 50.

Additionally, a relay 52 is located along the connection 50 and is of the type adapted to function as de-energized when the current flowing in connection 50 reaches a predetermined value.

The battery B is normally under a constant slow or trickle charge from the normal A.-C. source of electrical energy through the rectifier C so long as the normal supply line is supplied with power.

The magnitude of the electrical charging current is sufficient to maintain the battery at full electrical capacity when the battery is not connected to a load.

Connections 54 and 56 extend from the battery to the contacts for arms 58' of relay 58, and a separate power source is connected by 60 to the relay 58 for purposes to be described.

Other relays 62, 64, 66, 68, 70 and 72 are provided and have swinging arms or contacts 62', 64', 66', 68', 70', and 72', as is usual. The arms of the relays 44, 62, 64, 66, 68, 70 and 72 are shown in the energized position of their respective relays.

A motor of the synchronous type is shown at M which is connected across the normal A.-C. circuit 20 and 22 through appropriate connections. It has discs or cams 74 and 76 on the shaft thereof. Switch arms 74' and 76' are actuated into and out of contacting position by means of the discs or cams 74 and 76 respectively in the well known manner.

A rectifier is represented by R and signals or alarms in the form of buzzers or bells are shown at b and b' and other signals in the form of lights are represented by l and l'.

Relay 38 is connected by 78 to a contact for the motor switch arm 74' and said contact is connected by 80 to a contact of a relay 64, which contact is also connected by 82 to an arm 62' of the relay 62.

Arm 62' is shown in engagement with a contact connected by 84 to the relay 70.

Connection 86 extends between a contact of relay 62 and a contact for the motor switch arm 76'.

Relay 68 is connected to 88 which extends from a contact for the motor switch arm 76' to a contact for the arm 64' of the relay 64.

Relay 62 is connected by 90 to the connection 88 and is also connected to line 20 by 92.

Relays 64 and 66 are connected in series by 94 and 96 respectively to contacts for the arms 58' and 58' of the relay 58.

Arm 44' of the relay 44 is connected by 100 to the relay 70 and a contact of said relay 44 is connected by 102 to the arm 68' of the relay 68.

A connection 104 from a contact for arm 68' of relay 68 extends to line 22 through arm 64' of the relay 64.

A connection 106 from the arm 70' of the relay 70 includes a contact of relay 66 and extends to a contact for arm 52' of relay 52. The arm 52' is connected by 108 to line 24. Arm 66' of relay 66 is connected by 110 to the line 24.

Buzzer or bell b is connected by 112 to line 22 and by 114 to a contact for arm 70' of relay 70.

Light l is connected to line 22 by 116 and to line 114, as shown.

Relay 72 is connected by 73 and 75 to lines 22 and 24 respectively.

Buzzer b' and light l' are parallel connected by 118 to a contact of the arm 72' of relay 72 and by 120 to one side of an outside power source 122.

The other side of the electrical source 122 is connected by 124 to the arm 72' of the relay 72.

Motor M and rectifier R are in series with a connection 126 between line 20 and relay 68 and 126 is connected by 128 to the switch arms 74' and 76'.

Should the low trickle charging current fail for any reason, whereby the low trickle charge is prevented from entering the battery B, the derangement signals b and l in the supervisor are activated. Thus, a break in the main A.-C. supply line, a break in the transformer 28, a break in the resistor 42, a break in the rectifier C, or the like could arise so as to bring about the activation of these signals.

Across the battery B, a polarized type relay 64 is disposed and is adapted to be sensitive to the battery voltage, becoming energized when the battery is approximately at full electrical capacity thereby facilitating ascertainment as to whether a high fast charging current is or is not required.

If the battery is at a low electrical capacity, relay 64 deenergizes and induces a high fast charging current to the battery.

That is to say, if a high fast charging current is required, the contact of the relay 64 assumes a new position so as to place the relay 38 across the line thereby producing the high fast charging current.

The relay is connected in series with another relay 66 which is also of the sensitive type.

Relay 66 functions to supervise relay 64 and the main D.-C. supply line to the load L. That is, it has a supervisory capability in that it will deenergize in the event of any malfunction in the D.-C. supply lines or in the event of a disconnected battery.

Thus it will be observed that the supervised circuit comprises two primary relays 38 and 70 which are interconnected in a series of parallel circuits whereby any failure in one circuit causes action in the other circuit to the derangement signal.

Simultaneously with the deenergization of the relay 64, timer M is started and through its own contacts is stopped again preparatory to being restarted for the forced automatic charge. During the interval of timer operation, the charge is known as a forced high fast charge.

The timer functions to automatically cause the charger to continue the high fast charging current to the battery for a predetermined duration as a forced high fast charge in addition to the normal automatic high fast charge.

The timer M is in series with the relay 68 through the contacts of the relay which is normally energized whereat its contacts are closed. When relay 68 deenergizes, it opens the circuit to the motor M causing relay 70 to open and to actuate the signal.

The motor drives the timing cams 74 and 76 which are each in continuous contact with switches 74' and 76'. Said switches are arranged whereby, upon rotation of the cams, the circuits between the timer and the switches and interrupted.

One cam 76 is so adjusted as to cause the cycling switch 76' to stop the motor M and thereafter to start it again at a predetermined moment. Its function is purely one of cycling for the starting and stopping of the timer.

At a predetermined time thereafter, the forced charge cycling switch 74' is closed and opened again before the switch 76' closes during normal operation. The switch 74' causes relay 38 to become energized and to start the forced high fast charge to the battery B for the predetermined time interval.

The rectifier R is in series between the timer M and relay 68 and functions as an electrical brake on the timer motor.

On the initial start of an automatic high fast charge, the relay 38 is caused to be closed, the relay 64 having indicated that a high fast charge is necessary.

The unit continues on the automatic high fast charge until a predetermined battery capacity is attained. When the automatic high fast charge is completed, the audible derangement signal and/or the associated derangement light is/are actuated for a predetermined duration (e. g. 80 seconds) to indicate the completion of a charge.

Said derangement signal remains activated for the set time interval, the interval being determined by the timer cams.

At the end of said interval, another set of contacts 74' in the timer functions to close and complete the circuit once again to the relay 38 which in turn starts the forced high fast charge for another predetermined interval of time.

That is to say, following the automatic high fast charge, the timer is called into operation for the forced high fast charge. When the battery voltage is at the desired value, the relay 64 is restored to its normal position and the timer M starts once again to operate for the forced high fast charge period.

At the end of this forced high fast charge period, the timer has completed its cycle and its contacts are restored to their normal positions.

Reference has heretofore been made to the audible alarm means and the derangement light as signal means in the supervisor.

All wiring and circuit components which render either the battery charger or the D.-C. supply to the supplementary, auxiliary or emergency electrical load inoperative are capable of activating the audible alarm and/or the derangement light.

Such derangement signals, being both of the audible and visual signal type, serve to give warning of the malfunctioning of the normal and emergency electrical current sources whereby their proper functioning is jeopardized.

A silencing switch may be provided which is adapted to silence the audible alarm $b$ but which maintains the derangement indication through the light $l$. For various reasons, it may be desirable to inactivate the audible alarm $b$.

Upon correction of the faulty condition, the audible alarm is caused to sound once again until the silencing switch is restored to its normal position.

It will be appreciated that the derangement signals are activated whenever a faulty condition exists and also for the specified interval following the automatic high fast charge and preceding the forced high fast charge.

It is to be further appreciated that neither the battery B which supplies the D.-C. to the supplementary, auxiliary or emergency electrical load nor the normal A.-C. supply to the transformer is employed to supply current to the derangement signals in the supervisor.

A secondary supervisor functions to supervise the primary supervisor.

Same is provided with a relay 72 which is connected by connections 73 and 75 across the conductors 22 and 24 of the normal A.-C. supply source and remains energized so long as that electrical line is energized. The failure of the normal A.-C. source causes relay 72 to be deenergized so as to actuate the secondary supervisor. A separate source of supply of 120 volt A.-C. of a different phase supplies power directly to an auxiliary derangement bell $b'$ and an auxiliary derangement light $l'$.

If desired, the primary and/or secondary supervisor may be remotely located from the remainder of the system.

The separate 120 volt A.-C. supply to the secondary supervisor serves to provide a separate monitoring system whereby in the event of any failure of the primary monitoring system to function, the secondary monitoring system is automatically caused to function. Thus a double supervisory system is provided.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description and all modifications and variations as fall within the meaning and purview and range of equivalency of the appended claims are therefore intended to be embraced therein.

What it is desired to claim and secure by Letters Patent of the United States is:

1. In an electrical supply arrangement of the supplementary type, the improvement in means for supplying electrical current to an electrical load in the event of the failure of an electrical system normally supplying the electrical current comprising, a normal source of electricity, a continuously monitored normal electrical circuit connected to said normal source, a supplementary source of electricity, a continuously monitored supplementary electrical circuit connected when required to said supplementary source and an automatically controlled charger for automatically restoring the charge to said supplementary source.

2. In the arrangement of claim 1, the improvement including a fast charge timing mechanism for initiating a fast charge by said charger to said supplementary source upon attainment of a predetermined voltage therein following a predetermined time interval.

3. In the arrangement of claim 1, the improvement including, signal means for indicating the malfunction of one of said sources of electricity.

4. In an electrical system of the supplementary type, the improvement in means for supplying an electrical current to a supplementary electrical load in the event of a derangement of a system normally supplying electrical current comprising, a supplementary source of electricity, a supplementary electrical circuit connected to said supplementary source, and automatically timed means connected to the system normally supplying electrical current for maintaining the capacity of said supplementary source when a predetermined voltage of said supplementary source has been attained after a predetermined interval.

5. In the arrangement of claim 4, including, means for activating said supplementary electrical circuit by said supplementary source upon derangement of the system normally supplying electrical current.

6. The arrangement of claim 4, including, a signal means for creating a signal in the event of any malfunction of any system supplying electrical current.

7. In an electrical supply arrangement of the supplementary type, the improvement in means for supplying electrical current to a load in the event of the failure of an electrical system normally supplying electrical current to a load comprising, a supplementary source of electricity including a battery, means for supplying an electrical charging current to the battery of said supplementary source, a supplementary electrical circuit connectable to said supplementary source upon derangement of the electrical system normally supplying electrical current, and automatic voltage-sensitive means for varying the magnitude of the electrical charging current to the battery of said supplementary source upon reaching a predetermined value of discharge.

8. In the arrangement of claim 7, including, means for automatically transferring the battery of said supplementary source from one rate of charge to another rate of charge for restoring the battery to capacity following a discharge.

9. In the arrangement of claim 7, including, means for maintaining the battery of said supplementary source at a predetermined capacity for making the supplementary electrical power available for a predetermined minimum time.

10. In the arrangement of claim 7, including, means for automatically providing electrical charging current of a predetermined value to the battery of said supplementary source for a predetermined time interval.

References Cited in the file of this patent

UNITED STATES PATENTS

| Number | Name | Date |
|---|---|---|
| 1,710,542 | Landis | Apr. 23, 1929 |
| 1,786,280 | Woodbridge | Dec. 23, 1930 |
| 1,882,473 | Beetem | Oct. 11, 1932 |
| 1,931,867 | Holden | Oct. 24, 1933 |
| 1,953,602 | Hanley | Apr. 3, 1934 |